United States Patent [19]
Dobler et al.

[11] Patent Number: 5,994,788
[45] Date of Patent: Nov. 30, 1999

[54] DEVICE FOR THE CONTACTLESS TRANSFER OF SIGNALS BETWEEN TWO VEHICLE PARTS

[75] Inventors: Klaus Dobler, Gerlingen; Erich Zabler, Stutensee; Anton Dukart, Wörth; Thomas Herrmann, Langenbrettach, all of Germany

[73] Assignee: Robert Bosch GmbH, Stuttgart, Germany

[21] Appl. No.: 09/029,540
[22] PCT Filed: Jun. 25, 1996
[86] PCT No.: PCT/DE96/01115
  § 371 Date: Feb. 27, 1998
  § 102(e) Date: Feb. 27, 1998
[87] PCT Pub. No.: WO97/09201
  PCT Pub. Date: Mar. 13, 1997

[30] Foreign Application Priority Data
  Sep. 1, 1995 [DE] Germany ............ 195 32 296

[51] Int. Cl.$^6$ .................................................. H01F 27/42
[52] U.S. Cl. .................... 307/10.1; 307/104; 340/310.07
[58] Field of Search ........................ 307/9.1, 10.1, 307/10.4; 340/310.07, 870.31; 439/950; 336/DIG. 2; 455/41; 280/731; 419/10

[56] References Cited

U.S. PATENT DOCUMENTS

| | | | |
|---|---|---|---|
| 4,514,645 | 4/1985 | Endo et al. | 307/10.1 |
| 5,191,309 | 3/1993 | Laros | 336/120 |
| 5,313,037 | 5/1994 | Hansen et al. | 336/61 |
| 5,498,911 | 3/1996 | Bossler et al. | 307/10.1 |
| 5,636,863 | 6/1997 | Reid et al. | 280/735 |
| 5,828,940 | 10/1998 | Learman | 419/10 |

FOREIGN PATENT DOCUMENTS

| | | |
|---|---|---|
| 474298 | 3/1992 | European Pat. Off. |
| 24 33 555 | 1/1976 | Germany |
| 28 12 633 | 9/1979 | Germany |
| 38 12 633 | 10/1989 | Germany |

Primary Examiner—Richard T. Elms
Attorney, Agent, or Firm—Kenyon & Kenyon

[57] ABSTRACT

The transfer unit which brings about the signal connection between an airbag installed in a steering wheel and a circuit arranged outside the steering wheel possesses a primary and a secondary winding which are located in separate annular dished cores which are mounted rotatably with respect to one another about the steering wheel axis. To ensure that the transfer unit transfers airbag measurement signals with minimal falsification, one of its two dished cores is equipped with a U-shaped cross section, and the other dished core projects into the latter, so that the magnetic flux intersects the air gaps remaining between the two dished cores preferably in a direction radial to the rotation axis.

10 Claims, 2 Drawing Sheets

DEVICE FOR THE CONTACTLESS TRANSFER OF SIGNALS BETWEEN TWO VEHICLE PARTS

FIELD OF THE INVENTION

The present invention concerns an arrangement for non-contact transfer of signals between two vehicle parts mounted rotatably with respect to one another—preferably between a steering wheel equipped with an airbag, and a control circuit arranged on the chassis—and in particular an arrangement consisting of a transfer unit whose primary and secondary windings are located in separate annular dished cores which are located rotatably with respect to one another about the rotation axis of the vehicle parts, one of which has a U-shaped cross-section.

BACKGROUND INFORMATION

In order to activate and diagnose the airbag arranged in the steering wheel of a vehicle (driver's airbag), an arrangement is required which makes possible unimpeded signal transfer between the activation system of the airbag in the steering wheel and a control unit arranged outside the steering wheel, regardless of steering wheel position. This signal transfer was usually accomplished by means of slip rings or volute springs. As is already evident from German Patent No. 38 12 633 A1, mechanical contact devices of this kind interfere with steering wheel movement. In addition, they do not always guarantee unimpeded operation; in particular, because of relatively high resistance fluctuations, they falsify diagnosis of the activation system. The resistor of a firing capsule for the airbag usually has a very low resistance of about 2 ohms. For diagnosis of the airbag, this resistance is repeatedly measured and a fault message is reported to the driver via a warning light if the measured resistance exceeds or falls below the actual resistance of the firing capsule by a defined threshold. To allow a reliable diagnosis to be performed, a measurement of the resistance of the firing capsule must be guaranteed with very high accuracy; in other words, the system for signal transfer from the airbag to the control unit must exhibit only very small resistance fluctuations as measured at the firing capsule resistor. According to German Patent No. 28 12 633 A1 and German Patent No. 24 33 555, there is inserted between the steering wheel and steering column, instead of slip rings or volute springs, a transfer unit whose primary and secondary windings are mounted rotatably with respect to one another about the steering wheel axis. German Patent No. 24 33 555 discloses a transfer unit whose primary and secondary windings are located in separated dished cores which are arranged coaxially rotatably with respect to each other. This known transfer unit allows a relatively large leakage in the magnetic flux between the primary and secondary windings, so that the coupling between the two windings is not very close, and the accuracy with which the firing capsule resistance is measured suffers thereby.

A transfer unit of the type cited initially, in which the primary and secondary windings are each located in a U-shaped dished electrode, is known from European Patent No. 0 520 535 A. The two U-shaped dished cores are located one above another in the direction of the rotation axis, the end faces of the arms of U-shaped dished cores lying opposite one another. As a result, the magnetic flux through the two dished cores intersects the air gaps existing between the end faces of the arms in the direction of the rotation axis. A mutual axial offset of the two dished cores would modify the air gap, which has a very pronounced effect on magnetic coupling between the two windings of the transfer unit and correspondingly influences the accuracy with which the firing capsule resistance is measured.

It is therefore the object of the present invention to indicate a transfer unit of the type cited initially which makes possible a measurement of the resistance of the firing capsule with the greatest possible accuracy.

SUMMARY OF THE INVENTION

According to the present invention, a dished core of one winding penetrates into the dished core of the other winding, resulting in a very close coupling between the two windings. In addition, the dished cores are shaped in such a way that the air gaps existing between them are preferably intersected by the magnetic flux in a direction radial to the steering wheel axis. The effect of the latter feature is that the resistance measurements are largely independent of any axial offset of the two windings. Since the fit of the steering wheel on the steering column affects the offset between the two windings, but it is noncritical, there is no need to maintain very high tolerances when the steering wheel is being assembled. The design of the transfer unit according to the present invention thus allows a reliable measurement, insensitive to interference, of the firing capsule resistance.

A conical shape for the air gaps between the dished cores makes the measurement accuracy of the transfer unit even less sensitive to any axial offset of the two windings.

The measurement result is falsified by the fact that eddy currents occur in the dished cores, at least when they are made of iron, degrading coupling between the two windings and moreover making it temperature-dependent. It is therefore advantageous to inhibit the occurrence of eddy currents by providing indentations in the dished cores which lengthen the current paths, or to manufacture the dished cores from individual segments that are insulated from one another. Selected materials, for example ferrite, plastic-bonded ferrite powder, or plastic-bonded pure iron or nickel-iron powder, also result in an even greater reduction in eddy currents down to almost zero.

DETAILED DESCRIPTION

Figure 1:
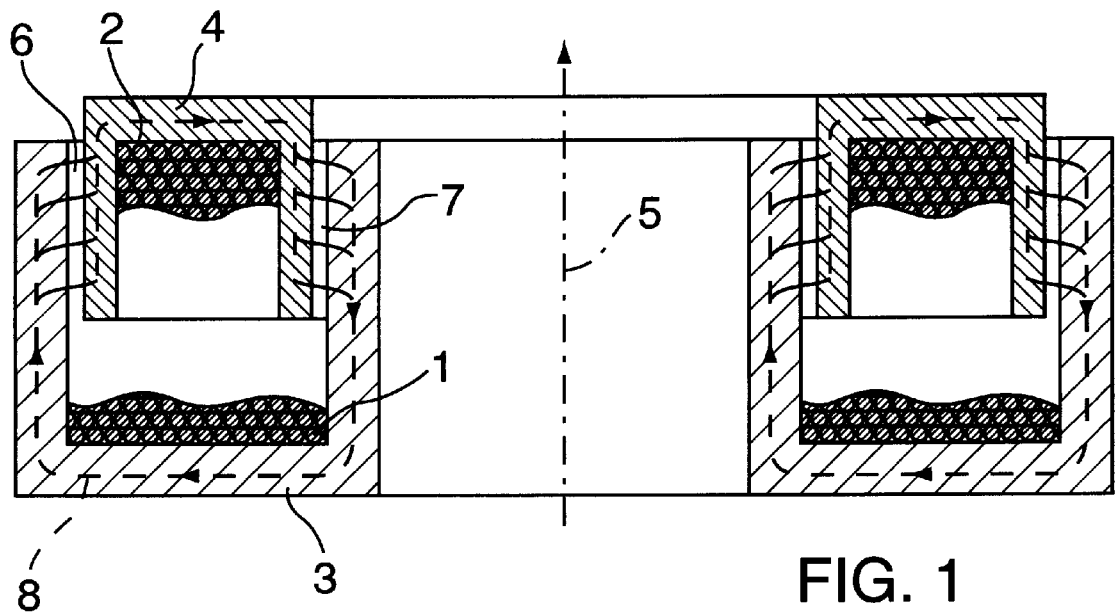
FIG. 1 is a cross-sectional view of a first embodiment of an arrangement according to the present invention.
Figure 2:
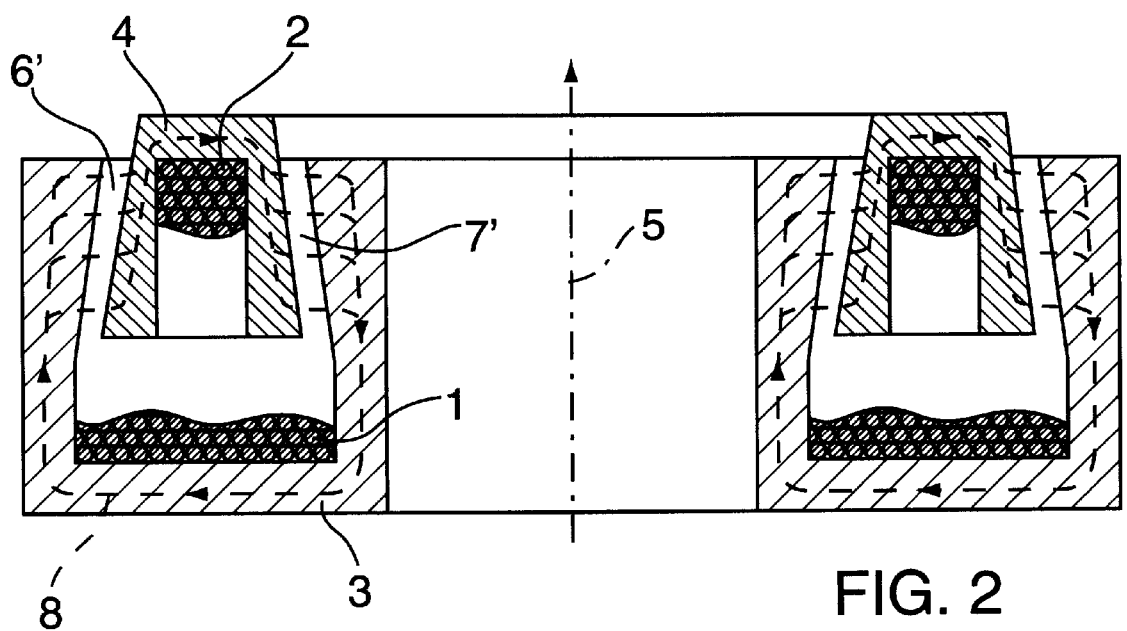
FIG. 2 is a cross-sectional view of a second embodiment of the arrangement according to the present invention.

FIG. 1 depicts a transfer unit with air gaps running parallel to the steering wheel axis, and FIG. 2 one with air gaps running obliquely with respect to the steering wheel axis.

FIG. 1 depicts a cross section through an annular transfer unit having a primary winding 1 and a secondary winding 2. Primary winding 1 is housed in a dished core 3 with a U-shaped cross-sectional profile, and secondary winding 2 in a dished core 4 which in this case is also U-shaped. Dished core 4 of secondary winding 2 projects into the other U-shaped dished core 3. The two dished cores 3 and 4 are mounted rotatably with respect to one another about central axis 5. Dished core 4 functions as a rotor and is joined to a steering wheel, and dished core 3 is affixed, as stator, to a stationary steering column (the steering wheel and steering column are not depicted in the drawings). Rotation axis 5 of the transfer unit coincides with the steering wheel axis. Of course the stator and rotor functions can also be exchanged between dished cores 3 and 4.

In the exemplary embodiment depicted in FIG. 1, dished cores 3 and 4 are shaped in such a way that air gaps 6 and 7 existing between them are oriented parallel to steering wheel axis 5. As indicated by dashed line 8, the magnetic flux is concentrated by the arms of dished cores 3 and 4 as it is guided around the windings 1 and 2, so that leakage fluxes, which might decrease the coupling between windings 1 and 2, are minimized. Magnetic flux 8 is also guided so that it intersects air gaps 6 and 7 in a direction radial to steeping wheel axis 5. Because of this profile, the effect on magnetic flux 8 of an axial offset between the two dished cores 3 and 4 is extremely small. The measurement of the resistance of the firing capsule connected to secondary winding 2 therefore experiences almost no falsification if an axial offset (with respect to axis 5) occurs between the two dished cores 3 and 4. A relatively large axial assembly tolerance for the steering wheel (up to 3 mm) will therefore have only a very minor effect on the result of the firing capsule measurement.

The influence of an axial displacement between the two dished cores 3 and 4 on the result of the firing capsule measurement can be almost completely compensated for by means of the exemplary embodiment of a transfer unit depicted in FIG. 2.

In contrast to the exemplary embodiment of FIG. 1, in the transfer unit of FIG. 2, the arms of the U-shaped dished cores 3 and 4 are conically shaped in such a way that air gaps 6' and 7' between the two are inclined toward one another in the direction of the opening of U-shaped dished core 3. If the axial offset between the two dished cores 3 and 4 is increased, the width of the two air gaps 6' and 7' then automatically decreases, and the effective permeability of the magnetic circuit constituted by dished cores 3 and 4 thus rises. This rise in permeability increases the coupling between the two windings 1 and 2, and counteracts the deterioration in coupling caused by the increase in axial offset between the two windings.

Figure 3:
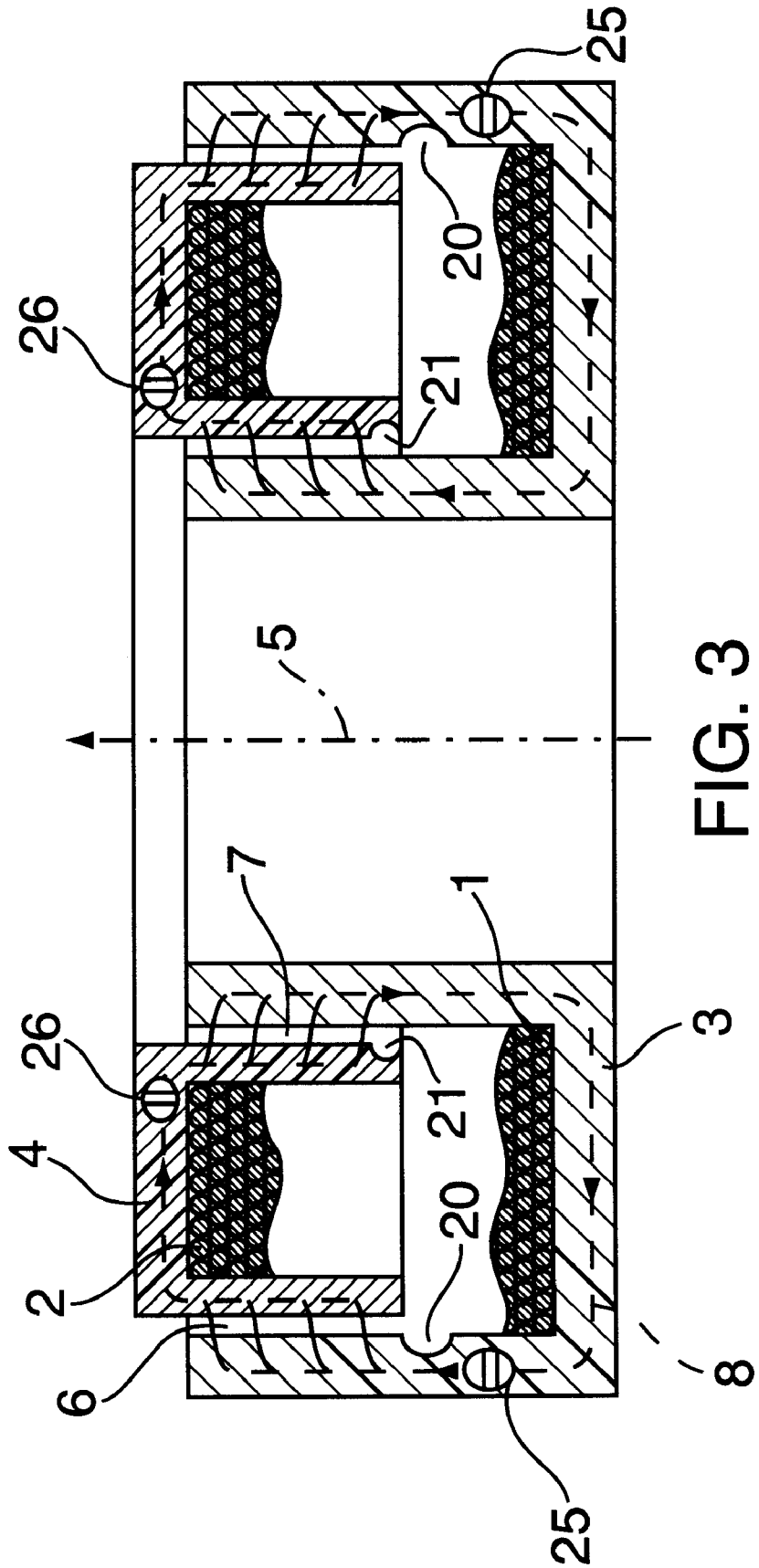
FIG. 3 is a cross-sectional view of a third embodiment of the arrangement according to the present invention.

Considerable eddy currents form in dished cores 3 and 4 if their material has a conductivity >10,000 S/m (e.g. iron). These eddy currents, which are also temperature-dependent, inhibit the magnetic flux and thus impair coupling between the two windings 1 and 2, making accurate diagnosis of the firing capsule resistance impossible. The eddy currents can be decreased by equipping dished cores 3 and 4 with indentations 20, 21 (shown in FIG. 3) which lengthen the path for the eddy currents, thus raising the resistance for the eddy currents. The eddy currents can be reduced even more effectively by assembling dished cores 3 and 4 from segments which are electrically insulated from one another. The most effective way to avoid eddy currents is to use materials with a low conductivity (<500 S/m) and a relative permeability >200 for dished cores 3 and 4. This material property is possessed, for example, by ferrite or plastic-bonded iron or ferrite powder or iron-nickel alloys. The purpose of the plastic is to encase very small metal particles 25, 26 in electrically insulating fashion, resulting in a high filling ratio in terms of the ferromagnetic metal. A further advantage of these powdered materials is that even complicated geometries can be economically produced relatively easily using the pressing or injection-molding process, so that chip-removing machining can be completely dispensed with. The strength of the shaped elements can be increased by subsequent heat treatment. Transfer characteristics can be improved even further by using nickel-iron (Ni50-Fe50), with a relative permeability >1000, as the material.

We claim:

1. An arrangement for a noncontact transfer of signals between two vehicle parts mounted rotatably with respect to one another, comprising:

a primary dished core having an annular shape and including a first inner extension and a first outer extension, the primary dished core having a U-shaped cross section;

a primary winding disposed in the primary dished core;

a secondary dished core having an annular shape and including a second inner extension and a second outer extension, the secondary dished core projecting into the primary dished core to form an air gap therebetween; and a secondary winding disposed in the secondary dished core, wherein at least one of the primary and secondary dished cores is rotatable about an axis, wherein the first inner extension of the primary dished core overlaps the second inner extension of the secondary dished core, wherein the first outer extension of the primary dished core overlaps the second outer extension of the secondary dished core and wherein a magnetic flux between the primary and secondary dished cores intersects the air gap.

2. The arrangement according to claim 1, wherein the two vehicle parts include a steering wheel equipped with an airbag and a control circuit arranged on a chassis, and wherein the magnetic flux intersects the air gap at a location between the first and second inner extensions in a direction substantially radial to the axis.

3. The arrangement according to claim 1, wherein the air gap includes first and second air gaps, wherein the first air gap is formed between the first inner extension and the second inner extension, and the second air gap is formed between the first outer extension and the second outer extension, and wherein the first and second air gaps are oriented axially parallel to one another.

4. The arrangement according to claim 1, wherein the air gap includes first and second air gaps, wherein the first air gap is formed between the first inner extension and the second inner extension, and the second air gap is formed between the first outer extension and the second outer extension, and wherein the first and second air gaps are inclined toward one another in a direction of an opening of the primary dished core.

5. The arrangement according to claim 1, wherein at least one of the primary and secondary dished cores includes a plurality of indentations in which eddy currents occur in current paths, the plurality of indentations lengthening the current paths.

6. The arrangement according to claim 2, wherein at least one of the primary and secondary dished cores is assembled, in regions through which eddy currents flow, from segments which are electrically insulated from one another.

7. The arrangement according to claim 6, wherein the primary and secondary dished cores consist of plastic-bonded iron powder.

8. The arrangement according to claim 6, wherein the primary and secondary dished cores consist of plastic-bonded ferrite powder.

9. The arrangement according to claim 6, wherein the primary and secondary dished cores consist of plastic-bonded nickel-iron powder.

10. The arrangement according to claim 1, wherein:

the two vehicle parts include a steering wheel, the first and second inner extensions are provided substantially near the steering wheel, and the first and second outer extensions are provided substantially away from the steering wheel.

\* \* \* \* \*